United States Patent
Datta

[11] 3,888,597
[45] June 10, 1975

[54] RETAINING ASSEMBLY

[75] Inventor: Arthur S. Datta, Willow Springs, Ill.

[73] Assignee: International Harvester Company, Chicago, Ill.

[22] Filed: Feb. 24, 1972

[21] Appl. No.: 228,998

[52] U.S. Cl. .............. 403/326; 285/321; 308/236
[51] Int. Cl. ............................................. F16d 1/06
[58] Field of Search............. 287/DIG. 7, 52.07, 52, 287/53 R; 85/88; 285/321, 276; 403/321, 326, 154, 155, 315

[56] References Cited
UNITED STATES PATENTS

| 2,051,704 | 8/1936 | Harris | 308/DIG. 11 |
| 2,539,387 | 1/1951 | Alden | 287/53 R |
| 2,848,255 | 8/1958 | Klein et al. | 285/321 |
| 3,130,765 | 4/1964 | Neuschotz | 151/41.7 |
| 3,217,774 | 11/1965 | Pelochino | 85/8.8 |

FOREIGN PATENTS OR APPLICATIONS

| 270,586 | 10/1966 | Australia | 285/276 |
| 940,797 | 6/1948 | France | 287/52 R |

OTHER PUBLICATIONS

Product Engineering, December 1933 pgs. 454–455, Article describing "Wire Locks and Snap Rings for Fastenings."

Primary Examiner—Andrew V. Kundrat
Attorney, Agent, or Firm—Raymond E. Parks; Floyd B. Harman

[57] ABSTRACT

A bored gear means that has in one face a counterbore which has a groove in its inside section. A cylindrical shaft journals the gear, the two being removably secured, from the same side, by first and second snap rings. The snap rings abut each other, while the remaining face of the first abuts the inner face of the counterbore, and the remaining face of the second abuts the outer face of the groove.

2 Claims, 3 Drawing Figures

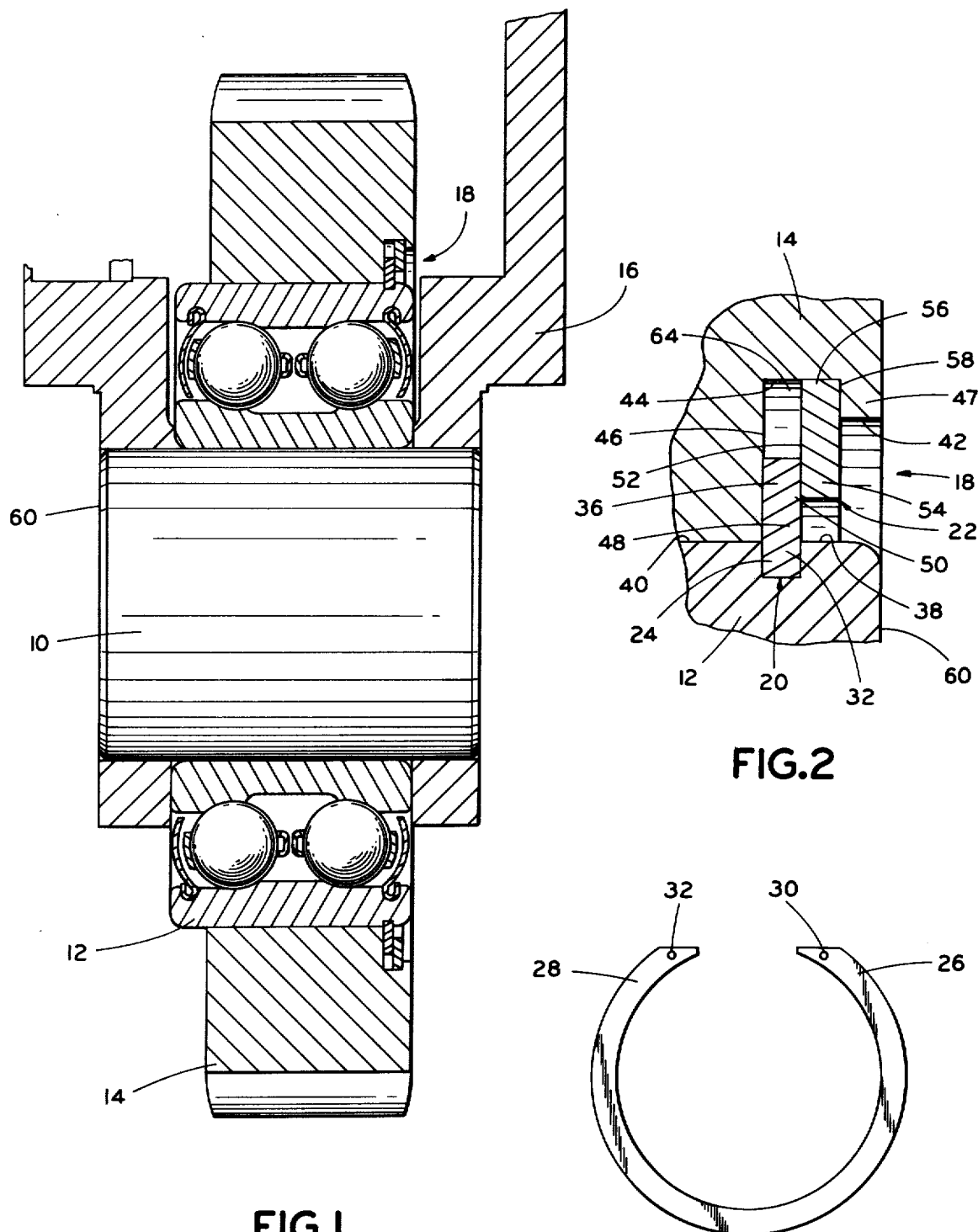

RETAINING ASSEMBLY

BACKGROUND OF THE INVENTION

This invention pertains to a restraining means and more particularly to an improved retaining ring assembly for securing machine parts such as gears, and the like against axial displacement along a cylindrical member such as a shaft.

It has been found in retaining elements rotating at high speed, such as gears on bearings or shafts, that the element to be retained walks or is displaced longitudinally along the cylindrical member with resultant excessive wear and interference with the other member. The provision of two retaining means, such as snap rings, one on each side of the gear, proves to be costly and, in some units, impossible due to the steps of assembly and limited space.

It is therefore an object of this invention to provide a snap ring retaining means which prevents longitudinal movement of the retained element;

In accordance with this invention an entirely removable retaining means is provided for the securing of a gear or other element on a cylindrical member against axial displacement therealong. This invention provides a plurality of snap ring means in conjunction with a series of grooves or counterbores such that only one side of the gear element is involved in securing the gear against movement in either direction. The provision of a ridge or shoulder on the bearing or shaft has been found objectionable for similar reasons.

Still another object of this invention is to provide a gear retaining assembly which allows removal of the gear from either end of the supporting member; and Yet another object of the invention is a method for retaining a gear from longitudinal movement on a shaft.

This and further objects of this invention will become readily apparent from the following detailed description of the drawing in which:

FIG. 1 is a longitudinal sectional view of a shaft assembly incorporating the retainer provided by this invention;

FIG. 2 is an enlarged fragmentary sectional view of the retainer and immediately adjacent parts of FIG. 1; and FIG. 3 is an enlarged view of a snap ring.

DESCRIPTION OF THE PREFERRED EMBODIMENT

Referring to FIG. 1 wherein a shaft or like cylindrical means 10 is shown having a bearing means 12 and gear means 14 mounted thereon. A housing means 16 encloses the assembly. A retaining means 18 fixes gear means 14 against axially moving in relationship to either shaft 10 or bearing 12.

As more clearly disclosed in FIG. 2, retaining means 18 includes a first and second spring like snap ring means 20 and 22. As shown, cylindrical member, or preferably bearing member 12, has a rectangular groove means 24 uniformly extending the circumference of the member 12 and snugly receiving said first external snap ring 20. First external snap ring 20, as shown in FIG. 3, is of the type having a non-continuous portion of near diameter with spaced-apart end means 26 and 28. The end means 26 and 28 being further characterized by having tool receiving means such as holes 30 and 32. In operation, ends 26 and 28 of snap ring 20, with the use of a tool (not shown) are forced apart then positioned in groove 24 and released to resume its normal posture. Snap ring 20, as so positioned, has an inner section 32 engaging groove 24 while an outer or peripheral section 36 projects above the surface 38.

The gear means 14, as shown in FIG. 2, has a bore 40, a counterbore means 42 and a groove means 44 along the periphery of the wall 46, such that groove 44 has a greater diameter than counterbore 42. In practice, counterbore 42 forms a ledge or projecting means 47 over second counterbore 44.

The second snap ring means 22 is similar in configuration with ring 20, but is internal rather than external in nature. That is, it must be compressed to a reduced diameter during installation, expanding upon the release of the compressive forces.

In operation, face 46 of gear means 14 abuts first face 48 of snap ring 20 such that horizontal movement to the right is substantially impossible. The second face 50 of snap ring 20 exists in an abutting relationship with first face 52 of inner section 54 of snap ring 22. The outer section 56 of snap ring 22 abuts face 58 of projection means 47 such that gear 14 is restrained from horizontal movement to the left.

As is apparent, the combined width of first snap ring 20 and second snap ring 22 is only very slightly less than the width of the groove means 44. Further, this snap ring assembly permits removal of the gear 14 from the end of the bearing or of the shaft closest thereto. That is, if snap ring 20 were a fixed part of bearing 12, it would be impossible to slide gear 14 off end 60 thereof. With this retaining assembly once the snap rings 20 and 22 have been removed, the gear 14 can be moved axially in either direction.

A further variation of this invention may be achieved in regard to the nature and extent to which groove means 44 is milled out. That is, groove means 44 need be milled out only sufficiently to provide a channel to secure snap ring 22 and to allow sufficient space such that snap ring 20 can be set in place. Thus, section 64 need be milled down only enough to allow positioning of snap ring 20 subsequently to gear 14 and groove 44 may be substantially similar to groove means 24.

Thus, it is apparent that there has been provided, in accordance with the invention, a snap ring assembly that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What I claim is:

1. A retaining assembly for securing an element against axial displacement along a cylindrical member, the cylindrical member having an external annular groove and the element having a bore with a two step internal annular groove therein, comprising:

a first snap ring of the external type seated in the external annular groove and extending radially toward one step of the internal annular groove, the external annular groove having an axial span substantially equal to the axial width of the first snap ring, a second snap ring of the internal type seated in the one step of the internal annular groove and concentrically engaging one end of the first snap ring, the one step of the internal annular groove having a uniform depth and an axial span substantially equal to the combined width of both snap rings and with one end wall engaging the other end of the first snap ring and the second step forming a reduced annular opening means between the element and the cylindrical member for providing access for inserting and removing the snap rings.

2. A retaining assembly as claimed in claim 1, wherein the second snap ring is of a near-diameter larger than that of the first snap ring.

* * * * *